(12) United States Patent
Suzuki et al.

(10) Patent No.: US 8,331,045 B2
(45) Date of Patent: Dec. 11, 2012

(54) CEMENTED OPTICAL ELEMENT

(75) Inventors: Tetsuya Suzuki, Osaka (JP); Toshiaki Takano, Osaka (JP); Tomokazu Tokunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 114 days.

(21) Appl. No.: 12/837,038

(22) Filed: Jul. 15, 2010

(65) Prior Publication Data

US 2011/0013294 A1    Jan. 20, 2011

(30) Foreign Application Priority Data

Jul. 17, 2009   (JP) .................................. 2009-168589

(51) Int. Cl.
*G02B 9/00* (2006.01)
(52) U.S. Cl. ........................................................ 359/796
(58) Field of Classification Search .................. 359/796, 359/797, 642
See application file for complete search history.

(56) References Cited

U.S. PATENT DOCUMENTS

| 5,253,111 | A | 10/1993 | Chiba et al. |
| 6,717,749 | B2 | 4/2004 | Abe |
| 2003/0086184 | A1 * | 5/2003 | Abe et al. ...................... 359/796 |
| 2003/0090622 | A1 | 5/2003 | Takeuchi |
| 2007/0091473 | A1 * | 4/2007 | Shimizu ........................ 359/796 |

FOREIGN PATENT DOCUMENTS

| JP | 2003-139914 | 5/2003 |
| JP | 2003-149603 | 5/2003 |

* cited by examiner

*Primary Examiner* — Alicia M Harrington
(74) *Attorney, Agent, or Firm* — Hamre, Schumann, Mueller & Larson, P.C.

(57) ABSTRACT

A cemented optical element includes a convex lens and a concave lens. The convex lens has a first convex surface and a second convex surface that are rotationally symmetric with respect to an optical axis. The convex lens has an edge with a thickness of substantially zero. The concave lens has a concave surface bonded to the first convex surface of the convex lens. Preferably, the peripheral portion of the concave lens extends radially outwardly beyond the convex lens to the extent that it is located within an area surrounded by an extension zone of the second convex surface of the convex lens.

5 Claims, 3 Drawing Sheets

CEMENTED OPTICAL ELEMENT

BACKGROUND OF THE INVENTION

1. Field of the Invention

The present invention relates to a cemented optical element in which a convex lens and a concave lens are bonded together.

2. Description of Related Art

Conventionally, a cemented optical element is used in an imaging lens or an optical system of an optical pickup device. Generally, in this cemented optical element, a convex lens and a concave lens are bonded together with an adhesive.

For example, JP 2003-139914 A discloses a cemented optical element in which a spacer for regulating the thickness of an adhesive layer is disposed between a convex lens and a concave lens. In this cemented optical element, the cylindrical end surface of the convex lens is used to fix the spacer.

Recently, further reduction in the thickness of an apparatus (for example, a digital camera), in which a cemented optical element is mounted, has been required. Because of this requirement, a reduction in the thickness of a cemented optical element also has been required.

However, in the case where the length of the end surface of the convex lens is long enough to fix the spacer, as in the cemented optical element disclosed in JP 2003-139914 A, there is a limit to reducing the thickness of the cemented optical element.

SUMMARY OF THE INVENTION

In view of these circumstances, it is an object of the present invention to provide a cemented optical element whose thickness further can be reduced.

In order to achieve the above object, the present inventors have made intensive studies. As a result, they have focused their attention on the fact that desired shaped convex and concave lenses are bonded together to obtain a conventional cemented optical element, and conceived an idea of bonding convex and concave lenses together and then grinding them to obtain a cemented optical element. The present invention has been made in view of this point.

That is, the present invention provides a cemented optical element including: a convex lens having a first convex surface and a second convex surface that are rotationally symmetric with respect to an optical axis; and a concave lens having a concave surface bonded to the first convex surface of the convex lens. This convex lens has an edge with a thickness of substantially zero.

As stated herein, the "edge of the convex lens" refers to a portion of the periphery of the convex lens where the first and second convex surfaces are closest to each other. For example, in the case where the convex lens has a circular shape in plan view (when viewed from the optical axis direction), the entire periphery of the convex lens is an edge. In the case where the cemented optical element is used in a digital camera, etc., and the convex lens does not have a circular shape in plan view but part of the circular shape, which is an area other than a rectangular effective area corresponding to the shape of a CCD sensor, is cut (hereinafter referred to as "D-cut"), if the resulting periphery includes a circular arc portion, the circular arc portion is an edge, and if the periphery is rectangular in shape including no circular arc, the four corners of the rectangle are edges.

The phrase the "thickness of substantially zero" means that the edge thickness is 0.2 mm or less.

According to the present invention, the edge thickness of the convex lens is substantially zero. Therefore, the thickness of the cemented optical element also can be reduced accordingly.

DETAILED DESCRIPTION OF THE INVENTION

Hereinafter, embodiments of the present invention will be described with reference to the accompanying drawings.

Figure 1A:
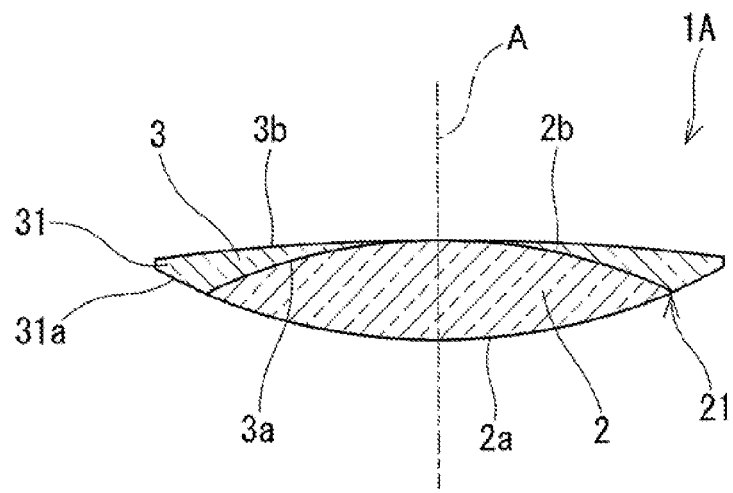
FIG. 1A is a cross-sectional view of a cemented optical element according to one embodiment of the present invention.
Figure 1B:
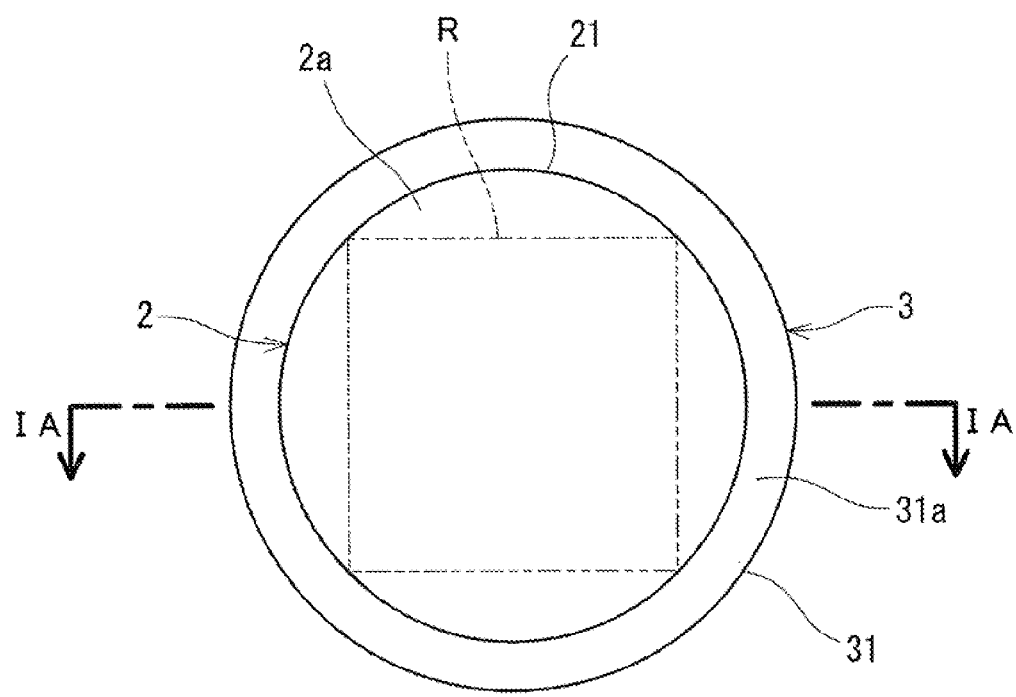
FIG. 1B is a bottom view of the cemented optical element.

FIGS. 1A and 1B show a cemented optical element 1A according to one embodiment of the present invention. This cemented optical element 1A includes a convex lens 2 and a concave lens 3 that are bonded to each other with an adhesive.

The convex lens 2 has a first convex surface 2b and a second convex surface 2a that are rotationally symmetric with respect to an optical axis A. The first and second convex surfaces 2b and 2a may be spherical surfaces or aspherical surfaces.

In the present embodiment, the convex lens 2 has a circular shape when viewed from the optical axis direction, and the entire periphery of the convex lens 2 is an edge 21. The thickness of the edge 21 is substantially zero.

For example, the convex lens 2 has a diameter of 10 mm, a thickness of 1.5 mm on the optical axis A, and a thickness of the edge 21 of 0.1 mm.

In the present embodiment, the cemented optical element 1A is used in combination with a CCD sensor, and the convex lens 2 has, on the second convex surface 2a, a rectangular effective area R corresponding to the shape of the CCD sensor. The length of the diagonal line of the effective area R is approximately the same as the diameter of a circle circumscribing the convex lens 2 when viewed from the optical axis direction (since the convex lens 2 is not D-cut in the present embodiment, the diagonal line has approximately the same length as the diameter of the convex lens 2). In other words, respective vertices of the effective area R are located on the periphery of the convex lens 2.

The concave lens 3 has a circular shape when viewed from the optical axis direction, and has a concave surface 3a bonded to the first convex surface 2b of the convex lens 2 and a back surface 3b that faces opposite to the convex lens 2. In the present embodiment, the concave lens 3 is a concave meniscus lens, in which the back surface 3b is a convex surface.

The peripheral portion 31 of the concave lens 3 extends radially outwardly beyond the convex lens 2. This peripheral portion 31 is located within an area surrounded by the extension zone of the second convex surface 2a of the convex lens 2. The extension zone is an extension of the curve of the second convex surface 2a. Specifically, the convex lens side surface 31a of the peripheral portion 31 is located on the extension zone of the second convex surface 2a of the convex lens 2, and this surface 31a forms, together with the second convex surface 2a of the convex lens 2, a continuous curved surface.

Preferably, the thickness of the concave lens 3 is 0.3 mm or less on the optical axis A, from the viewpoint of reducing the thickness of the cemented optical element 1A.

For example, the diameter of the concave lens 3 is 15 mm, and the thickness on the optical axis is 0.1 mm.

As described above, since in the cemented optical element 1A of the present embodiment, the thickness of the edge 21 of the convex lens 2 is substantially zero, the thickness of the cemented optical element 1A also can be reduced accordingly.

Since the length of the diagonal line of the rectangular area R on the second convex surface 2a of the convex lens 2 is approximately the same as the diameter of the convex lens 2, the size of the convex lens 2 also can be reduced to the utmost. As a result, the weight of the convex lens 2 can be reduced. For example, in the case where the cemented optical element 1A is driven by a motor for the purpose of auto-focusing, etc., the load on the motor can be reduced.

Furthermore, since in the present embodiment, the convex lens side surface 31a of the peripheral portion 31 of the concave lens 3 forms a continuous curved surface together with the second convex surface 2a of the convex lens 2, light scattering on the peripheral portion of the cemented optical element 1A can be prevented.

In addition, since the peripheral portion 31 of the concave lens 3 extends outwardly, this peripheral portion 31 can be utilized to incorporate the cemented optical element 1A into a lens barrel with high accuracy using a spherical bearing.

Next, a method of manufacturing the cemented optical element 1A is described. The following description will be made on the assumption that the convex and concave lenses of the dimensions exemplified above are fabricated.

Figure 2B:
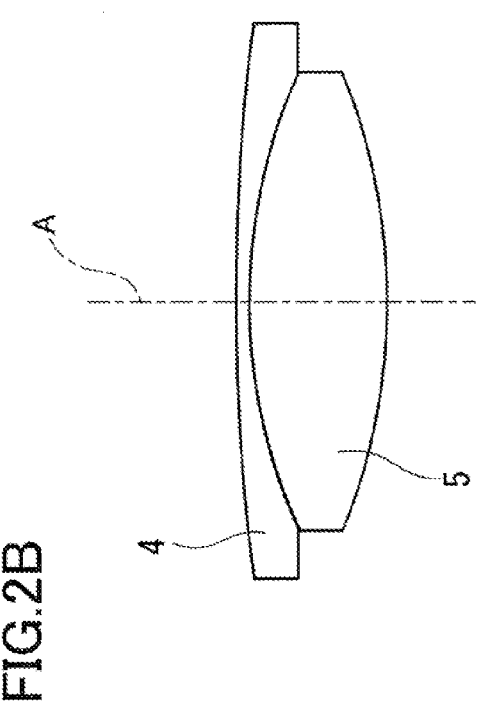
FIGS. 2A to 2D are flow charts showing a method of manufacturing the cemented optical element shown in FIG. 1A.
Figure 2D:
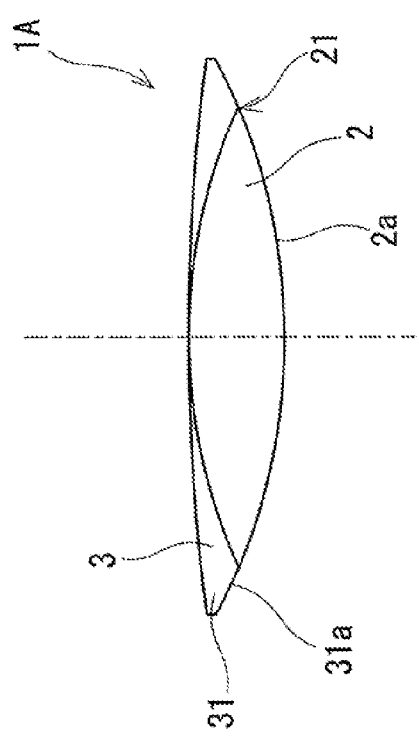
Figure 2A:
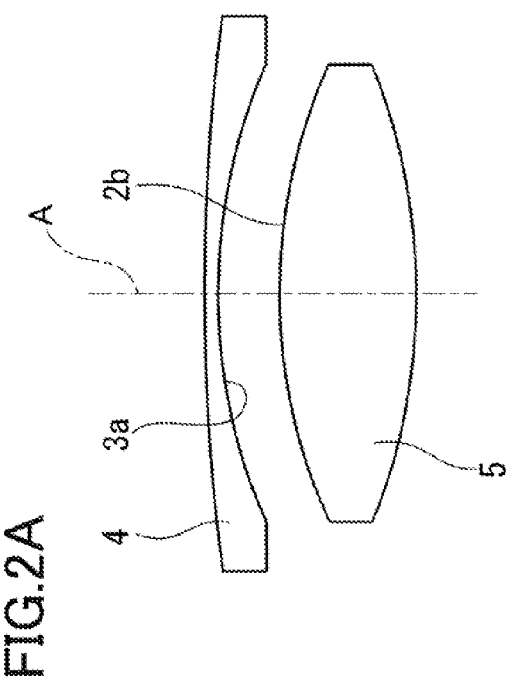

First, as shown in FIG. 2A, an original concave lens 4 having the above-mentioned concave surface 3a of the concave lens 3 and an original convex lens 5 having the above-mentioned first convex surface 2b of the convex lens 2 are prepared. These original concave and convex lenses 4 and 5 are subjected to centering processing, and their end surfaces each form a cylindrical surface with its center on the optical axis A. The original concave lens 4 has a diameter of 15 mm, and a thickness of 1.0 mm on the optical axis A. The original convex lens 5 has a diameter of 10 mm, a thickness of 2.5 mm on the optical axis A, and an edge thickness of 1.0 mm.

In the first step, the original concave lens 4 and the original convex lens 5 are bonded together with an ultraviolet curable adhesive. Specifically, the ultraviolet curable adhesive is applied onto the concave surface 3a of the original concave lens 4 so as to form an adhesive layer with a thickness of 0.02 mm, and the original convex lens 5 is placed on the adhesive layer. Then, the resulting structure is irradiated with ultraviolet light to cure the adhesive. Thus, a cemented structure shown in FIG. 2B is obtained.

Figure 2C:
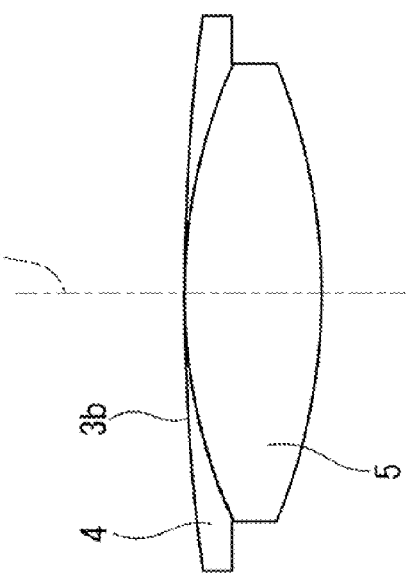

Next, as shown in FIG. 2C, the surface of the original concave lens 4 opposite to the original convex lens 5 is ground until the thickness of the original concave lens 4 on the optical axis A is reduced to 0.1 mm. Then, as shown in FIG. 2D, the surface of the original convex lens 5 opposite to the original concave lens 4 is ground until the edge thickness of the original convex lens 5 is reduced to 0.1 mm. The peripheral portion of the original concave lens 4 also is ground together with the original convex lens 5. Thus, the cemented optical element 1A can be obtained.

In the case where finished convex and concave lenses are bonded together as in the conventional method, if the thickness on the optical axis of the concave lens is small, the concave lens is deformed due to the shrinkage of the curing adhesive, and therefore, the shape accuracy of the concave lens side surface may not be sufficiently high in the resulting cemented optical element. In contrast, according to the above-described manufacturing method, the original concave lens 4 and the original convex lens 5 having sufficient rigidity are bonded together and then subjected to grinding. Therefore, the shape accuracy of both surfaces of the resulting cemented optical element 1A is good. Furthermore, since the original convex lens 5 also is ground after it is bonded to the original concave lens 4, the convex lens 2 having the edge 21 with a thickness of substantially zero can be fabricated easily.

(Modifications)

Figure 3:
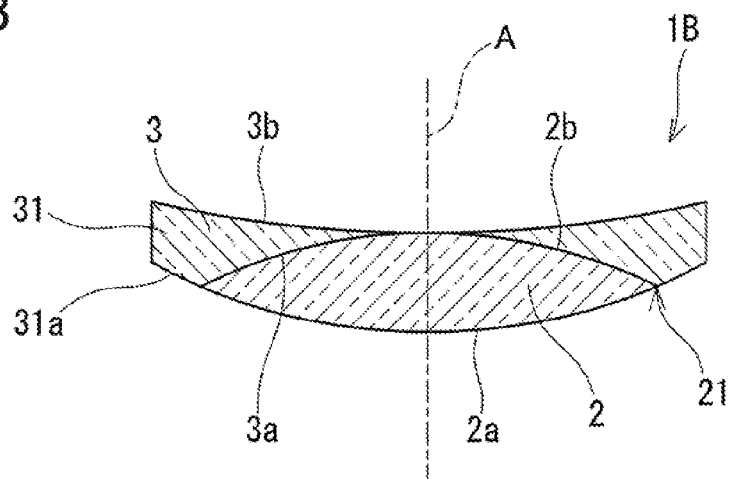
FIG. 3 is a cross-sectional view of a modified cemented optical element in which a concave lens has a concave back surface.

In the present embodiment, the back surface 3b of the concave lens 3 is a convex surface, but the concave lens 3 may be a biconcave lens whose back surface 3b also is a concave surface, like a modified cemented optical element 1B shown in FIG. 3.

Figure 4:
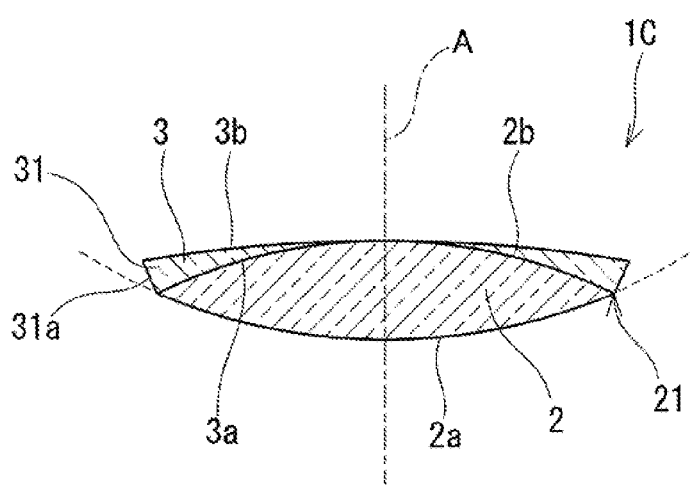
FIG. 4 is a cross-sectional view of a modified cemented optical element in which a convex lens side surface of a peripheral portion of a concave lens is located away from an extension zone of the second convex surface of the convex lens.

The peripheral portion 31 of the concave lens 3 need only be located within an area surrounded by the extension zone of the second convex surface 2a of the convex lens 2. The convex lens side surface 31a need not necessarily be located on the extension zone of the second convex surface 2a of the convex lens 2. For example, like a modified cemented optical element shown in FIG. 4, the convex lens side surface 31a of the peripheral portion 31 may be a tapered surface, which is located away from the extension zone of the second convex surface 2a of the convex lens 2. With such a shape, when the convex lens 2 is fabricated, only the original convex lens 5 can be ground without grinding the peripheral portion of the original concave lens 4.

Figure 5:
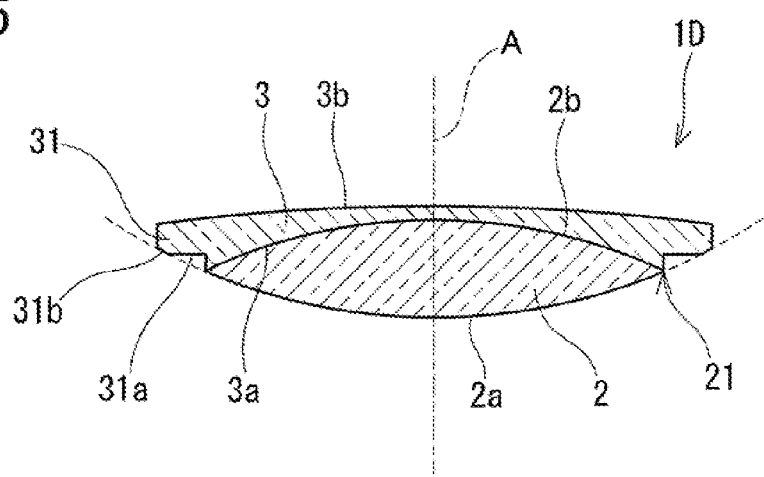
FIG. 5 is a cross-sectional view of a modified cemented optical element in which part of a convex lens side surface of a peripheral portion of a concave lens is located on an extension zone of the second convex surface of the convex lens.

It is, however, preferable that at least part of the convex lens side surface 31a of the peripheral portion 31 be located on the extension zone of the second convex surface 2a of the convex lens 2. For example, like a modified cemented optical element 1D shown in FIG. 5, the concave lens 3 may be shaped so that only part of the peripheral portion of the original concave lens 4 is ground when the original convex lens 5 is ground.

The peripheral portion 31 of the concave lens 3 need not necessarily extend radially outwardly beyond the convex lens 2. For example, the peripheral portion 31 of the concave lens 3 may form an end surface that is a cylindrical surface passing the edge 21 of the convex lens 2. In this case, the length of the diagonal line of the effective area R on the second convex surface 21 of the convex lens 2 is slightly shorter than the diameter of the convex lens 3.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A cemented optical element comprising:
a convex lens having a first convex surface and a second convex surface that are rotationally symmetric with respect to an optical axis; and
a concave lens having a concave surface bonded to the first convex surface of the convex lens,
wherein the convex lens has an edge with a thickness of substantially zero.

2. The cemented optical element according to claim 1, wherein the concave lens has a peripheral portion that extends radially outwardly beyond the convex lens, and the peripheral portion is located within an area surrounded by an extension zone of the second convex surface of the convex lens.

3. The cemented optical element according to claim 2, wherein the peripheral portion of the concave lens has a surface on the side of the convex lens, and at least part of the surface is located on the extension zone of the second convex surface of the convex lens.

4. The cemented optical element according to claim 3, wherein the convex lens side surface of the peripheral portion of the concave lens forms, together with the second convex surface of the convex lens, a continuous curved surface.

5. The cemented optical element according to claim 1, wherein the concave lens has a thickness of 0.3 mm or less on the optical axis.

* * * * *